United States Patent [19]

Stadler

[11] 4,031,934

[45] June 28, 1977

[54] ADJUSTABLE ROUTER BIT

[76] Inventor: Rigo Stadler, 65 Hillside Ave., New York, N.Y. 10040

[22] Filed: Sept. 1, 1976

[21] Appl. No.: 719,622

[52] U.S. Cl. .............................. 144/218; 83/527; 83/665; 83/699; 90/15 B; 144/114 R; 144/130; 144/134 A

[51] Int. Cl.² ..................... B27C 5/00; B27G 13/12

[58] Field of Search ........... 144/114 R, 117 B, 131, 144/130, 115, 126, 134 R, 136 R, 218, 219, 230; 83/665, 698, 699, 527; 90/12 D, 15, 15 A, DIG. 3, 19, 15 B, 17

[56] References Cited

UNITED STATES PATENTS 2,392,035  1/1946  Fett ..................................... 90/17

3,841,368  10/1974  Ritter ............................... 90/15 A

Primary Examiner—Othell M. Simpson
Assistant Examiner—W. D. Bray
Attorney, Agent, or Firm—James J. Cannon, Jr.; James J. Cannon

[57] ABSTRACT

An adjustable router bit for cutting wood and plastics whereby the depth of the cut may be varied through an adjustment means comprising a guide plate having a circular rotatable locating plate mounted therein and secured thereto and the shaft of the cutter head eccentrically located on said rotatable locating plate. The eccentric position of said shaft on a rotatable plate provides a means for varying the depth of cut of the router bit blades in a stepless fashion.

1 Claim, 3 Drawing Figures

ADJUSTABLE ROUTER BIT

BACKGROUND OF THE INVENTION

1. Field of the Invention

This invention pertains to cutting tools for use on wood or plastic, and particularly to bits for routers. It is directed in particular to a means for adjustment of the depth of the cut, thereby eliminating the need for frequent bit changes. It also features replaceable blades for ease of blade change and sharpening of blades.

2. Description of the Prior Art

The prior patent art contains numerous examples of cutting tools and bits, many with replaceable blades. With minor exceptions, none of the prior patent art shows a cutter with means for adjusting the depth of the cut. The exceptions, such as U.S. Pat. No. 1,620,847, effect an adjustment of depth by adjusting the projection of the cutting blades. This adjustment means has obvious limitations for precision work since it is obviously impossible to adjust the blades equally. The device of the present invention overcomes this limitation and provides a means for minute adjustment of the depth of cut from flash cuts to rabbit cuts controlled by a single clamp screw. The present device also replaces roller bearings with a guide plate, making the bit easier to use and control.

SUMMARY OF THE INVENTION

This invention pertains to an adjustment means for router bits used in cutting wood or plastic materials. The adjustment means comprises a guide plate having a rotatable circular locating plate securably mounted therein and retained by two retaining screws. The guide plate also has a tension groove running lengthwise from the locating plate toward one end thereof. A clamp screw is inserted horizontally within said guide plate and through said groove to provide a means for tightening and loosening said locating plate. Eccentrically mounted in said locating plate is the shaft for router cutting head with blades. A cutter head having two blades is fixably mounted to said shaft. The combination of a rotatable cutter head eccentrically mounted on the rotatable locating plate can produce a potential hypocycloid motion of the router blades. Blades are mounted in the cutter head such that at one extreme the blades are flush with the edge of the guide plate, while when the locating plate is rotated 180°, the blades will make the greatest depth of cut possible with a particular embodiment, the cutter blades then extending the greatest possible distance beyond the guide plate. Thus, a stepless adjustment from a flash cut to a rabbit cut is made possible by a rotation of the locating plate.

DESCRIPTION OF THE PREFERRED EMBODIMENT

Figure 1:
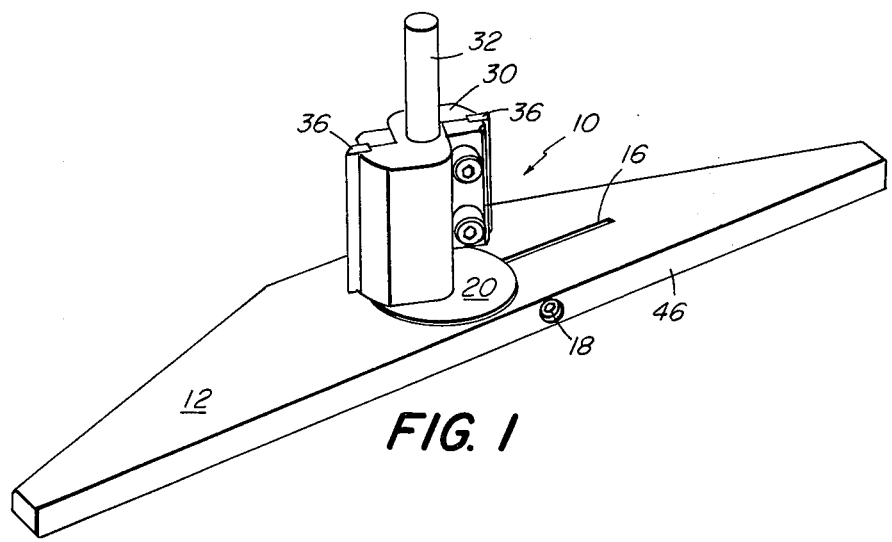
FIG. 1 is an inverted perspective view of the adjustable router device of the present invention.

Referring now to the drawings, and in particular to FIG. 1, reference numeral 10 refers generally to the adjustable router device of the present invention. Router device 10 includes guide plate 12 having a circular opening 14 centrally located along its lengthwise axis and a tension groove 16 cut from the perimeter of said circular opening 14 towards one end of guide plate 12 parallel to the lengthwise axis of guide plate 12. The opening of groove 16 is controlled by clamp screw 18 which is recessed into guide plate 12 and passes through groove 16 parallel to the horizontal axis of guide plate 12. A circular plate, known as an locating plate 20, slightly thicker than guide plate 12 is inserted within circular opening 14 of guide plate 12 such that the base of locating plate 20 is flush with the base of guide plate 12 and the bottom of excentor 20 protrudes slightly above the top of guide plate 12, the bottom perimeter 22 being slightly larger in diameter than circular opening 14 to assist in retaining excentor in the guide plate 12. Excentor 12 is also held in position by retaining screws 24 and washers 26 which extend downwards through its base and together with perimeter edge 22 serve to retain locating plate 20 in its position. When clamp screw 18 is loosened and groove 16 is opened slightly, locating plate 20 can rotate within opening 14. When clamp screw 18 is tightened and groove 16 is slightly closed, locating plate 20 cannot rotate, but is held tightly in a fixed position.

Figure 3:
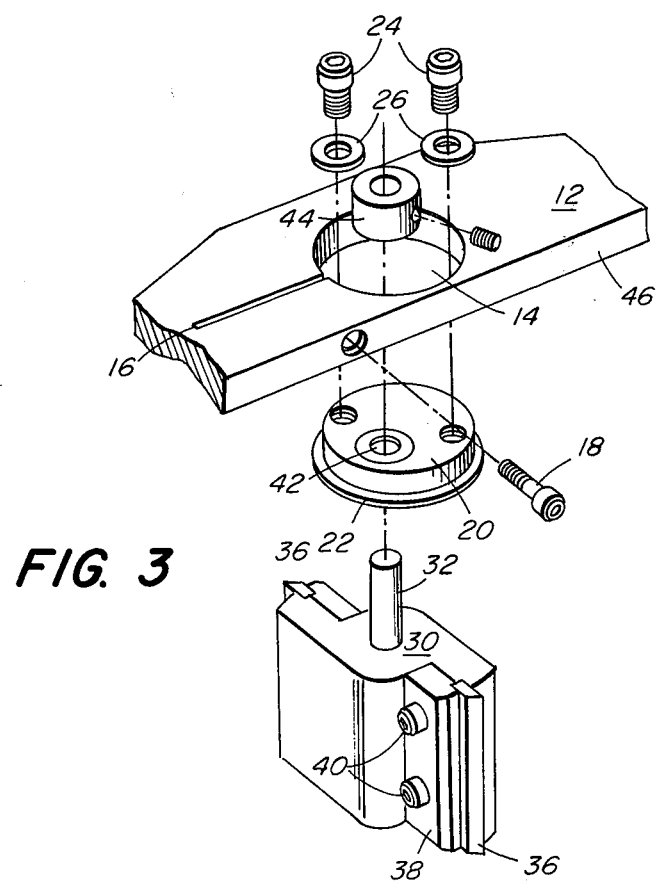
FIG. 3 is an exploded view of the components of the adjustable router device of FIG. 1.

Referring now to FIGS. 1 and 3, cutting head 28 comprises a Z-shaped block 30 securely mounted on a cylindrical shaft 32, each leg of said Z-shaped block 30 having notches to assist in positioning cutting blades 36. Cutting blades 36 are held in position at the extreme ends of Z-shaped block 30 by notched retaining blocks 38 which are secured by set screws 40.

Figure 2:
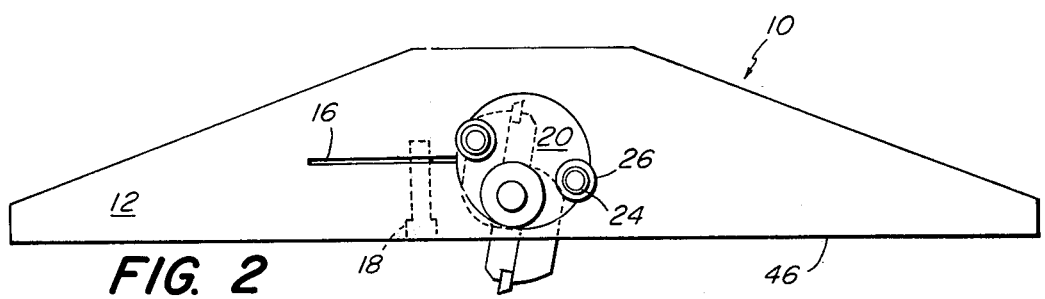
FIG. 2 is a top view of the adjustment device of FIG. 1.

Referring to FIGS. 2 and 3, shaft 32 is secured to locating plate 20 through opening 42 in locating plate 20. A screw-tightened retaining ring 44 is used to hold shaft 32 in place. Opening 42 is eccentrically located on locating plate 20 such that when locating plate 20 is rotated through an arc of 180° the relative position of the leading edges of cutting blades 36 relative to the forward edge 46 of guide plate 12 varies from being flush to extending a substantial distance beyond said forward edge. FIG. 2 illustrates a position in which locating plate 20 is rotated such that shaft 32 is in its closest position to forward edge 46 of guide plate 12. In this position one leg of Z-shaped cutter head block 30 extends beyond forward edge 46 and the cutting blade 36 extends still further beyond it. When locating plate 20 is secured in this position by tightening clamp screw 18, router bit 10 will make its deepest cut. If clamp screw 18 is loosened and locating plate 20 is rotated 180°, then clamp screw 18 is tightened again, shaft 32 will be at its furthest point from leading edge 46 of guide plate 12. At this point only a small portion of the leading edge of cutting blades 36 will extend beyond the forward edge 46 of guide plate 12. In this position the router bit 20 will make only a flush cut. The rotation and securing of locating plate 20 between zero and 180° will vary the depth of the cut of blades 36 in a stepless fashion from a flush cut to the maximum depth cut. Thus the combination of an eccentrically mounted rotating shaft 32 secured to the rotatable excentor 20 produces a means of stepless depth adjustment for the cut of the cutting blades 36.

Having described the preferred embodiment, it should be obvious to those skilled in the art that many variations of the preferred embodiment may be made within the spirit and scope of the following claims.

I claim:
1. In a router bit having replaceable cutting blades in a cutter head secured to a rotatable shaft, a device for adjustment of the depth of cut of said cutting blades comprising:
- a lengthwise oriented guide plate having a circular opening centrally located along its horizontal axis adapted to receive a circular, rotatable plate and having a tension groove emanating from said circular opening parallel to the lengthwise axis of said guide plate;
- a clamp screw threadably inserted in the leading edge of said guide plate and extending through said tension groove to open and close said groove;
- a circular plate rotatably mounted in said circular opening in said guide plate, having a lower perimeter edge slightly larger in diameter than said circular opening;
- said circular plate being retained in said guide plate by its lower perimeter edge and by retaining screws and washers on its upper surface;
- said circular plate being able to rotate when said clamp screw is loosened and being held in a fixed position when said clamp screw is tightened;
- the shaft of said router bit, being eccentrically secured to said rotatable plate such that the depth of cut of said router bit is controlled by the rotation of said circular plate.

* * * * *